(12) United States Patent
O'Neill

(10) Patent No.: US 7,866,148 B2
(45) Date of Patent: Jan. 11, 2011

(54) COMBUSTION CONTROL UTILIZING EXHAUST THROTTLING

(75) Inventor: Jonathan O'Neill, Erith (GB)

(73) Assignee: Ford Global Technologies, LLC, Dearborn, MI (US)

( * ) Notice: Subject to any disclaimer, the term of this patent is extended or adjusted under 35 U.S.C. 154(b) by 580 days.

(21) Appl. No.: 11/532,451

(22) Filed: Sep. 15, 2006

(65) Prior Publication Data
US 2008/0066459 A1    Mar. 20, 2008

(51) Int. Cl.
*F01N 1/00* (2006.01)
(52) U.S. Cl. ............... 60/324; 60/274; 60/278; 60/292; 123/90.15; 123/568.11; 123/568.14
(58) Field of Classification Search .......... 60/274, 60/278, 285, 287, 292, 324; 123/90.13, 90.15, 123/568.11, 568.14, 698
See application file for complete search history.

(56) References Cited

U.S. PATENT DOCUMENTS

| 6,135,088 A | 10/2000 | Duret |
| 6,390,057 B2 | 5/2002 | Yoshizawa et al. |
| 6,772,585 B2 * | 8/2004 | Iihoshi et al. .......... 60/277 |
| 6,880,518 B2 * | 4/2005 | Shiraishi et al. ........... 123/295 |
| 6,907,870 B2 * | 6/2005 | zur Loye et al. .......... 123/594 |
| 6,932,062 B2 * | 8/2005 | Kuzuyama et al. ...... 123/568.13 |
| 6,968,677 B2 * | 11/2005 | Tamura .......... 60/277 |
| 7,089,913 B2 * | 8/2006 | Yamaoka et al. ........ 123/406.48 |
| 7,182,050 B2 * | 2/2007 | Hitomi et al. ............ 123/58.8 |
| 7,263,824 B2 * | 9/2007 | Bellinger et al. ............. 60/288 |
| 7,275,514 B2 * | 10/2007 | Kuo et al. ................. 123/299 |

* cited by examiner

*Primary Examiner*—Binh Q Tran
(74) *Attorney, Agent, or Firm*—Allan J. Lippa; Alleman Hall McCoy Russell & Tuttle LLP

(57) ABSTRACT

A method of operating an engine for a vehicle includes operating the cylinder to achieve controlled autoignition of an air and a fuel mixture within the cylinder. During a transient condition, such as a gear change, an exhaust throttle is adjusted to maintain controlled autoignition within the cylinder. In this way, it is possible to sustain autoignition operation throughout the gear change.

13 Claims, 6 Drawing Sheets

COMBUSTION CONTROL UTILIZING EXHAUST THROTTLING

BACKGROUND AND SUMMARY

Vehicles having an internal combustion engine can operate in a variety of modes. As one example, an engine may operate in a spark ignition (SI) mode, wherein a charge of a mixture of air and fuel is ignited by a spark performed by a sparking device within a combustion chamber. As another example, an engine may operate in a compression ignition mode, wherein a mixture of air and fuel are compressed within a combustion chamber by a piston, causing ignition of the charge without necessarily requiring the addition of a spark from a sparking device.

One type of compression ignition known as homogeneous charge compression ignition (HCCI) utilizes compression of a substantially homogeneous mixture of air and fuel to achieve controlled autoignition (CAI). In some conditions, HCCI includes the advantages of improved fuel efficiency and/or reduced emissions over other operating modes, such as SI. However, autoignition may not always be reliably achieved, during some conditions. For example, at some engine loads and/or speeds, the engine may not produce enough heat to maintain autoignition, thereby potentially causing misfire, noise and vibration harshness (NVH), and/or decreased engine performance.

In one approach, as described in U.S. Pat. No. 6,135,088, an engine may be controlled to operate in a spark ignition mode or a stratified self-ignition mode by varying an exhaust throttle to control the exhaust gas recirculation (EGR) that is provided to the engine.

However, the inventors herein have recognized a disadvantage with this approach. Specifically, under some conditions, the use of exhaust gas throttling to maintain combustion over an extended duration can cause a decrease in engine efficiency, thereby reducing fuel economy. In other words, this approach may utilize exhaust throttling to such an extent to maintain combustion performance that efficiency gains achieved via compression ignition are overcome by throttling efficiency losses.

In another approach, the above issues may be addressed by a method of operating an engine for a vehicle having at least one cylinder and an exhaust passage communicatively coupled to the cylinder including at least one exhaust throttle disposed therein downstream of the cylinder, the method comprising operating the cylinder to achieve controlled autoignition of an air and a fuel mixture with the cylinder; during a first transient condition, adjusting at least the exhaust throttle to maintain controlled autoignition within the cylinder; during a second transient condition, adjusting at least an actuator other than the exhaust throttle to maintain controlled autoignition within the cylinder; wherein said first transient condition is more rapid than said second transient condition.

In this way, it may be possible to coordinate various control operations of the engine by recognizing that some control operations provide more rapid response than others, while at the same time considering overall system efficiency. For example, the exhaust throttle may be used to respond to more rapid transient conditions such as gear changes to maintain homogeneous charge compression ignition operation, while other control devices such as intake and/or exhaust valves, turbo-charging, intake air conditioning or heating may be adjusted to respond to less rapid transient conditions.

DETAILED DESCRIPTION

Figure 1:
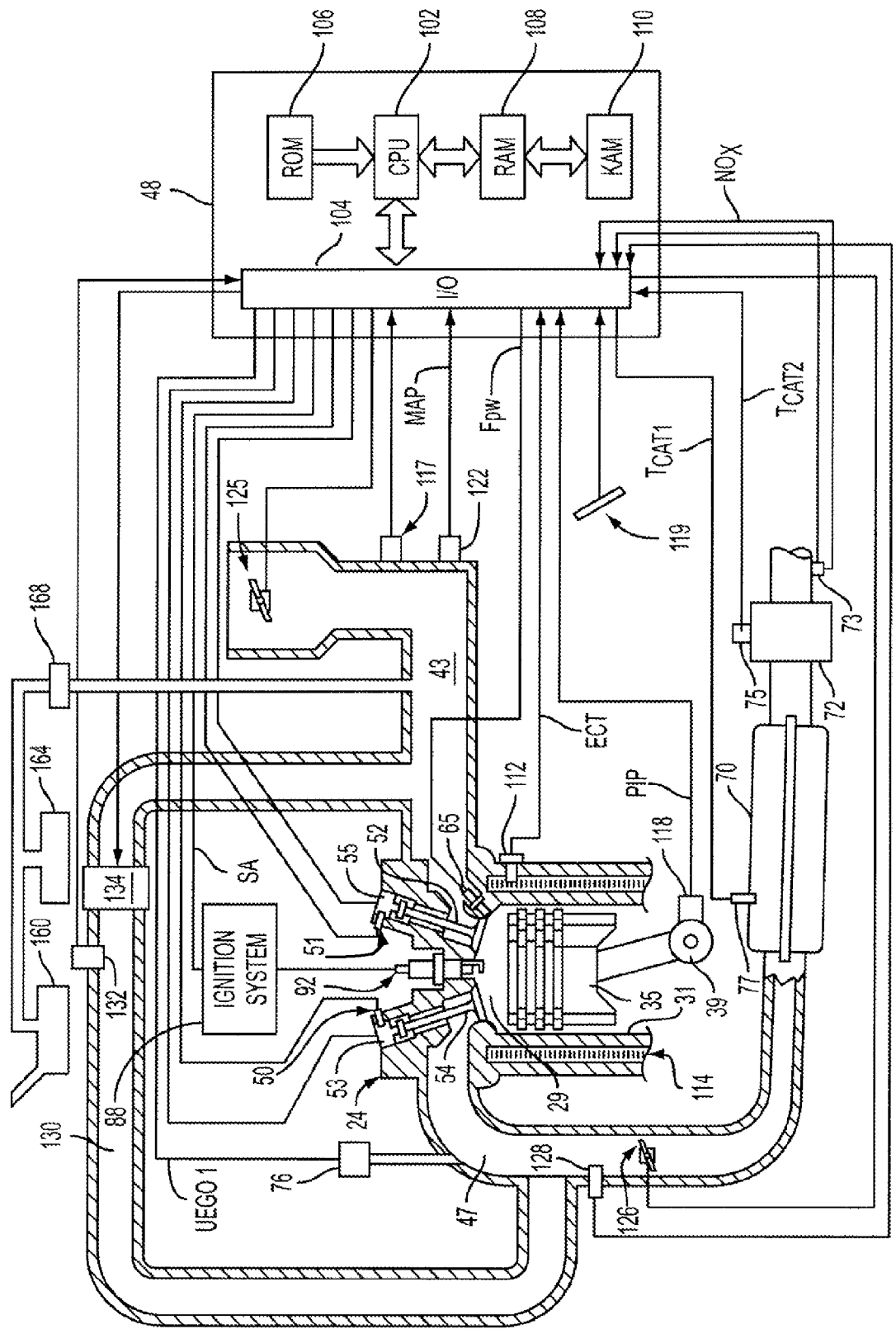
FIG. 1 shows one cylinder of an example engine for a vehicle.

FIG. 1 shows an example internal combustion engine 24 for a vehicle. One cylinder or combustion chamber 29 of multi-cylinder engine 24 as shown in FIG. 1 is controlled by a control system including electronic engine controller 48. Combustion chamber 29 includes cylinder walls 31 with a piston 35 positioned therein and connected to crankshaft 39. Combustion chamber 29 is shown communicating with intake manifold 43 and exhaust manifold 47 via respective intake valve 52 and exhaust valve 54. While only one intake and one exhaust valve are shown, the engine may be configured with a plurality of intake and/or exhaust valves, for example, as shown in FIG. 2.

Engine 24 is further shown configured with an exhaust gas recirculation (EGR) system for supplying exhaust gas to intake manifold 43 from exhaust manifold 47 via EGR passage 130. The amount of exhaust gas supplied by the EGR system can be controlled by EGR valve 134 via a signal supplied by controller 48. Further, the exhaust gas within EGR passage 130 may be monitored by an EGR sensor 132, which can be configured to measure temperature, pressure, gas concentration, gas composition, etc. Under some conditions, the EGR system may be used to regulate the temperature of the air and fuel mixture (i.e. initial charge temperature) supplied to the combustion chamber, thus providing a method of controlling the timing of autoignition for some compression ignition combustion modes such as homogeneous charge compression ignition (HCCI) mode.

In some embodiments, as shown in FIG. 1, variable valve timing may be provided to the exhaust and/or intake valves by electrically actuated valves (EVA) 53 and 55, respectively. However, mechanical valve control devices may be used such as variable cam timing (VCT) and/or cam profile switching (CPS) devices, among others. In some embodiments, valves may be controlled by a combination of electrically and mechanically actuated devices. For example, cam actuated exhaust valves may be used with electrically actuated intake valves, if desired. Exhaust and intake valve position feedback can be provided via comparison of signals from respective sensors 50 and 51.

Engine 24 may also have a fuel injector 65 coupled thereto for delivering liquid fuel in proportion to the pulse width of signal Fpw directly to combustion chamber 29. As shown, the engine may be configured such that the fuel is injected directly into the engine cylinder, which is known to those skilled in the art as direct injection. However, in an alternate embodiment, port injection may be used. Distributorless ignition system 88 provides an ignition spark to combustion chamber 29 via spark plug 92 in response to signal SA. Universal Exhaust Gas Oxygen (UEGO) sensor 76 is shown coupled to exhaust manifold 47 upstream of catalytic converter 70. The signal from sensor 76 can be used to advantage during feedback air/fuel control in a conventional manner to maintain average air/fuel at stoichiometry during a stoichiometric homogeneous mode of operation, for example.

Controller 48 is shown in FIG. 1 as a conventional microcomputer including: microprocessor unit 102, input/output ports 104, and read-only memory 106, random access memory 108, keep alive memory 110, and a conventional data bus. Controller 48 is shown receiving various signals from sensors coupled to engine 24, in addition to those signals previously discussed, including: engine coolant temperature (ECT) from temperature sensor 112 coupled to cooling sleeve 114; a pedal position sensor 119 coupled to an accelerator pedal; a measurement of engine intake manifold pressure (MAP) from pressure sensor 122 coupled to intake manifold 43; a measurement of engine exhaust manifold pressure and/or temperature via sensor 128; a measurement (ACT) of engine air charge temperature or intake manifold temperature from temperature sensor 117; and an engine position sensor from a Hall effect sensor 118 sensing crankshaft 39 position. In some embodiments, the requested torque can be determined by pedal position, vehicle speed, and/or engine operating conditions, etc. In one aspect of the present description, engine position sensor 118 produces a predetermined number of equally spaced pulses every revolution of the crankshaft from which engine speed (RPM) can be determined.

FIG. 1 shows engine 24 configured with an aftertreatment system comprising a catalytic converter 70 and a lean NOx trap 72. In this particular example, temperature Tcat1 of catalytic converter 70 is measured by temperature sensor 77 and temperature Tcat2 of lean NOx trap 72 is measured by temperature sensor 75. Further, gas sensor 73 is shown arranged in exhaust passage 47 downstream of lean NOx trap 72, wherein gas sensor 73 can be configured to measure the concentration of NOx and/or $O_2$ in the exhaust gas. Lean NOx trap 72 may include a three-way catalyst that is configured to adsorb NOx when engine 24 is operating lean of stoichiometry. The adsorbed NOx can be subsequently reacted with HC and CO and catalyzed when controller 48 causes engine 24 to operate in either a rich homogeneous mode or a near stoichiometric homogeneous mode. Such operation can occur during a NOx purge cycle when it is desired to purge stored NOx from the lean NOx trap, or during a vapor purge cycle to recover fuel vapors from fuel tank 160 and fuel vapor storage canister 164 via purge control valve 168, or during operating modes requiring more engine power, or during operation modes regulating temperature of the emission control devices such as catalyst 70 or lean NOx trap 72. It will be understood that various different types and configurations of emission control devices and purging systems may be employed.

Intake manifold 43 is shown communicating with optional intake throttle 125, which may be electrically controlled via controller 48. Similarly, exhaust manifold 47 is shown communicating with exhaust throttle 126, which may also be electrically controlled via controller 48. Alternatively, intake and/or exhaust throttles may be mechanically controlled. In some conditions, controller 48 may vary the position of exhaust throttle 126 in order to increase the backpressure provided to one or more cylinders of engine 24. By varying the backpressure provided to some or all of the cylinders of the engine, the work performed by the engine may be increased to achieve the same output for a given set of operating conditions. In this manner, the engine may be able to continue operating in an existing mode such as HCCI, where it may be otherwise difficult to achieve reliable combustion.

In some embodiments, an exhaust manifold of an engine such as engine 24 may include a plurality of exhaust throttle configurations, for example, as shown in FIG. 2. FIG. 2A shows engine 24 as having four cylinders 29a, 29b, 29c, and 29d, which can each include some or all of the various components described above with reference to cylinder 29 of FIG. 1. As such, each of the cylinders may have their own spark plug, fuel injector, intake valves and exhaust valves, etc. For example, cylinder 29a is shown having two intake valves 52a and 52b and two exhaust valves 54a and 54b. Similarly, each of the other cylinders of engine 24 may have two intake and/or two exhaust valves. Exhaust manifold 47a is shown communicating with each of the exhaust valves of engine 24. Further, in the non-limiting example shown in FIG. 2A, a single exhaust throttle 126a may be arranged downstream of where each of the exhaust passages are combined to form a single exhaust passage. For example, in some embodiments, the exhaust throttle may be arranged within the first substantially straight section of the exhaust passage after where the exhaust passages from each of the cylinders are combined to form a single passage. In this manner, a single exhaust throttle may be used to vary the backpressure supplied to all of the cylinders of the engine.

Figure 2A:
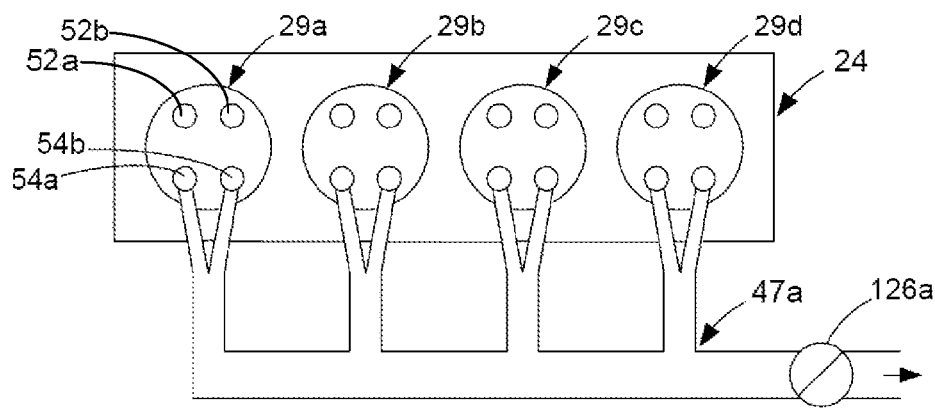
FIG. 2 shows examples of exhaust throttle configurations.
Figure 2B:
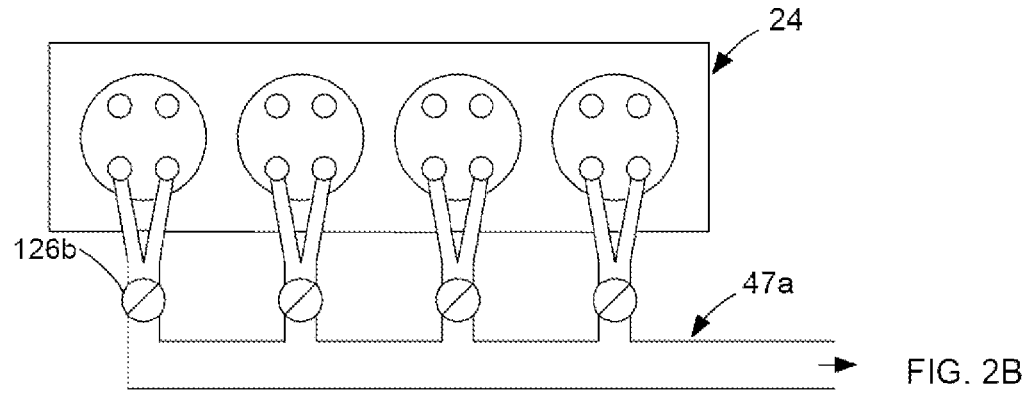

However, other exhaust throttle configurations are possible. FIG. 2B shows exhaust manifold 47a coupled to engine 24 having a plurality of exhaust throttles. For example, FIG. 2B shows how an exhaust throttle may be arranged downstream of where exhaust passages of each of the exhaust valves of a single cylinder are combined, yet upstream of where each of the cylinders are combined. Further, as shown in FIG. 2B, each cylinder may have an independent dedicated exhaust throttle. In this manner, an exhaust throttle such as throttle 126b can be used to vary the backpressure supplied to both exhaust valves of single cylinder, independent of the backpressure supplied to the other cylinders.

Figure 2C:
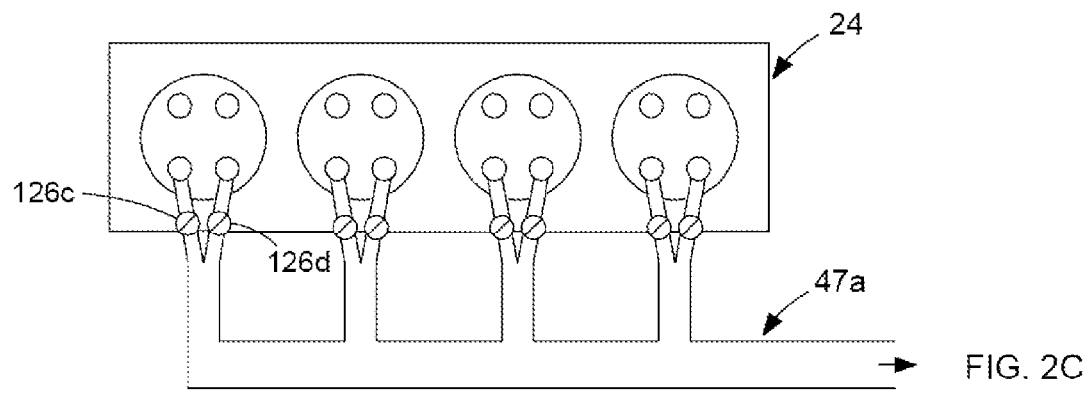

FIG. 2C shows how each cylinder may have a plurality of exhaust throttles arranged downstream of the exhaust valves, yet upstream of where the exhaust passages from the exhaust valves are combined. For example, exhaust throttles 126c and 126d may be used to independently vary the backpressure supplied to individual exhaust valves of a cylinder.

Figure 2D:
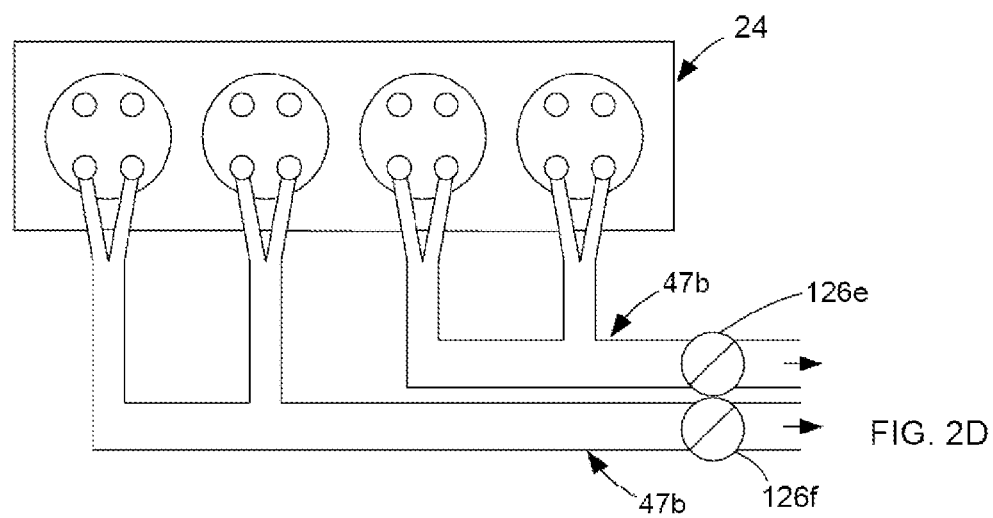

FIG. 2D shows engine 24 having an exhaust manifold 47b having two portions, each communicating with separate groups or banks of cylinders. In this example, a first exhaust throttle 126e can be used to vary the backpressure supplied to a first group of cylinders and a second exhaust throttle 126f can be used to vary the backpressure supplied to a second group of cylinders. Thus, the backpressure supplied to the first group of cylinders may be varied independently of the second group of cylinders.

It should be appreciated that FIGS. 2A-2D are merely examples of how an exhaust system for an engine may include one or more exhaust throttles. Each of the examples provided herein may include more or less throttles than presented in the specific examples. Further, the example engine and/or exhaust manifold configurations may represent portions of a larger engine and/or exhaust manifold system. For example, the configuration shown in FIG. 2 may represent one side of an eight cylinder engine having a V-configuration.

As will be described in more detail below, combustion in engine 24 can be of various types, depending on a variety of conditions. In one example, a spark ignition (SI) mode may be performed where the engine utilizes a sparking device to combust a mixture of air and fuel within a combustion chamber. In another example, a homogeneous charge compression ignition (HCCI) mode may be used where a substantially homogeneous air and fuel mixture is compressed within a combustion chamber by a piston until the mixture attains a temperature where it autoignites without requiring a spark from a sparking device. However, it should be appreciated that a spark may be used during HCCI mode to initiate autoignition of the mixture, for example, after the desired autoignition timing to reduce the occurrence of misfire. In yet another example, the engine may operate in a compression ignition mode that is not necessarily homogeneous. It should be appreciated that the examples disclosed herein are non-limiting examples of the many possible modes that may be utilized by the engine.

During HCCI mode operation, the air/fuel mixture may be highly diluted by air and/or residuals (e.g. lean of stoichiometry), which may result in lower combustion gas temperature. Thus, engine emissions may be substantially lower than SI combustion under some conditions. Further, fuel efficiency with autoignition of lean (or diluted) air/fuel mixture may be increased by reducing the engine pumping loss, increasing gas specific heat ratio, and by utilizing a higher compression ratio. During HCCI combustion, autoignition of the combustion chamber gas may be controlled so as to occur at a prescribed time so that a desired engine torque is produced. Thus, the timing of autoignition during HCCI mode may be largely dependent upon the operating conditions of the engine, such as for example, initial charge temperature and/or pressure. Since the temperature of the intake air entering the combustion chamber is one factor attributing to the desired autoignition timing, operating in HCCI mode at high and/or low engine loads may be difficult.

In one approach, some of the exhaust gases produced by the engine may be trapped and/or re-circulated back into the cylinder(s), thereby adding heat to the air and fuel charge. However, the achievable HCCI operating window for low speed and/or low load conditions may be limited by the temperature of the trapped exhaust gases from the previous cycle. That is, if the temperature of the trapped gases are too low, then HCCI combustion may not be possible or may result in torque disturbances and/or noise and vibration harshness (NVH) at the next combustion event. Thus, such a scenario may result in a transition from HCCI mode to a more robust operation such as SI mode in order to maintain combustion.

Figure 3:
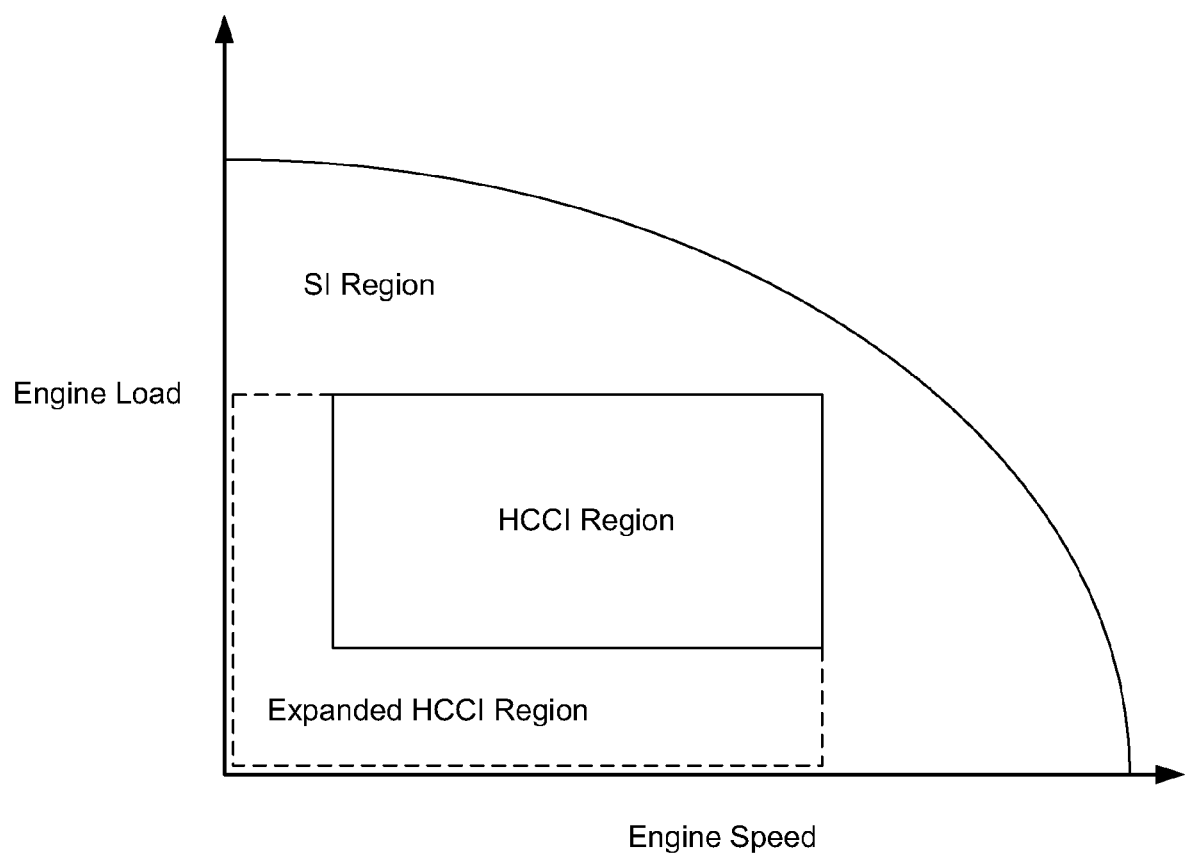
FIG. 3 shows a mode map for an example engine control strategy.

FIG. 3 shows a mode map for an example engine control strategy. The map of FIG. 3 shows engine load (e.g. torque) on the vertical axis and engine speed on the horizontal axis. The SI mode operating region is shown bound by the vertical axis on the left hand side, the horizontal axis on the bottom, and the engine operating envelope therebetween. As described above, SI mode may be more robust than other compression ignition modes due to the use of spark initiated combustion. In this manner, SI mode may be used during substantially all operating conditions within the engine operating envelope. However, it may be desirable to utilize modes other than the SI mode when improved efficiency and/or reduced emissions may be achieved. As such, an HCCI operating region represented in this example generally by a rectangular window is shown within the SI mode operating region. During some operating conditions, such as when the engine load and speed are within the HCCI mode operating region, engine 24 may operate in HCCI mode to achieve improved fuel economy and/or reduced emissions. During other operating conditions, outside of the HCCI mode operating region, the engine may be operated in SI mode.

In this manner, an engine such as engine 24 described herein may be configured to operate in SI mode during some conditions and HCCI mode during other conditions. As the operating conditions of the engine vary with engine operation, the engine may be controlled by the control system (e.g. controller 48) to transition between various modes of operation such as, for example, SI mode to HCCI mode or HCCI mode to SI mode. Further, these transitions may be performed by adjusting one or more operating conditions such as spark timing, intake and/or exhaust valve timing and/or lift, turbocharging, fuel injection timing and/or quantity, air/fuel ratio, intake air heating, EGR addition, intake throttle position, exhaust throttle position, etc.

Further, the region indicated by the broken line and labeled as the expanded HCCI region includes operating conditions where HCCI mode may be difficult to maintain, such as during low speed and/or low load conditions. One scenario where a low speed and/or low load condition may occur is during a gear change. For example, an engine operating in HCCI mode may be transitioned to SI mode before and/or during a gear change, and transitioned back to HCCI mode after the gear change so that reliable combustion may be maintained throughout.

Further still, in some embodiments, some cylinders of the engine may operate in a different mode than other cylinders of the engine. For example, an engine having eight cylinders can be configured to operate with a first group or bank of four cylinders in SI mode, while a second group of cylinders are operated in HCCI mode. Further, some of the cylinders may be configured to transition between modes while other cylinders are configured to remain in a particular mode. For example, a first bank of cylinders may be operated in SI mode irrespective of operating conditions, while a second bank of cylinders may operate in either HCCI mode or SI mode depending on the operating conditions. In such a configuration, only some of the cylinders may communicate with an exhaust throttle. For example, only the cylinders capable of operation in HCCI mode may include at least one exhaust throttle in the exhaust passage downstream of the cylinders. However, it should be appreciated that some or all of the cylinders may include at least one exhaust throttle located downstream.

While transitions between SI and HCCI may be used to enable the engine to selectively operate in the more advantageous mode responsive to the varying operating conditions, some transitions may result in penalties for emissions, efficiency (e.g. fuel economy), and/or possible torque or NVH disruptions. As such, it may be desirable to reduce transitions, for example, between SI mode and HCCI mode, at least during some conditions.

In one approach, transitions may be reduced by utilizing one or more throttles within the exhaust system to assist in maintaining HCCI operation during some operating conditions such as during periods of low engine speed and/or low load, as may occur, for example, during a gear change. In this approach, at least one exhaust throttle may be adjusted to provide increased back pressure on the engine (or at least one cylinder of the engine), thereby increasing the amount of work performed for the same speed, load and/or other operating conditions. In this manner, the engine (or at least one cylinder of the engine) may remain operating in HCCI mode where otherwise may not occur, as shown in FIG. 3 as the expanded HCCI region, for example.

Figure 4:
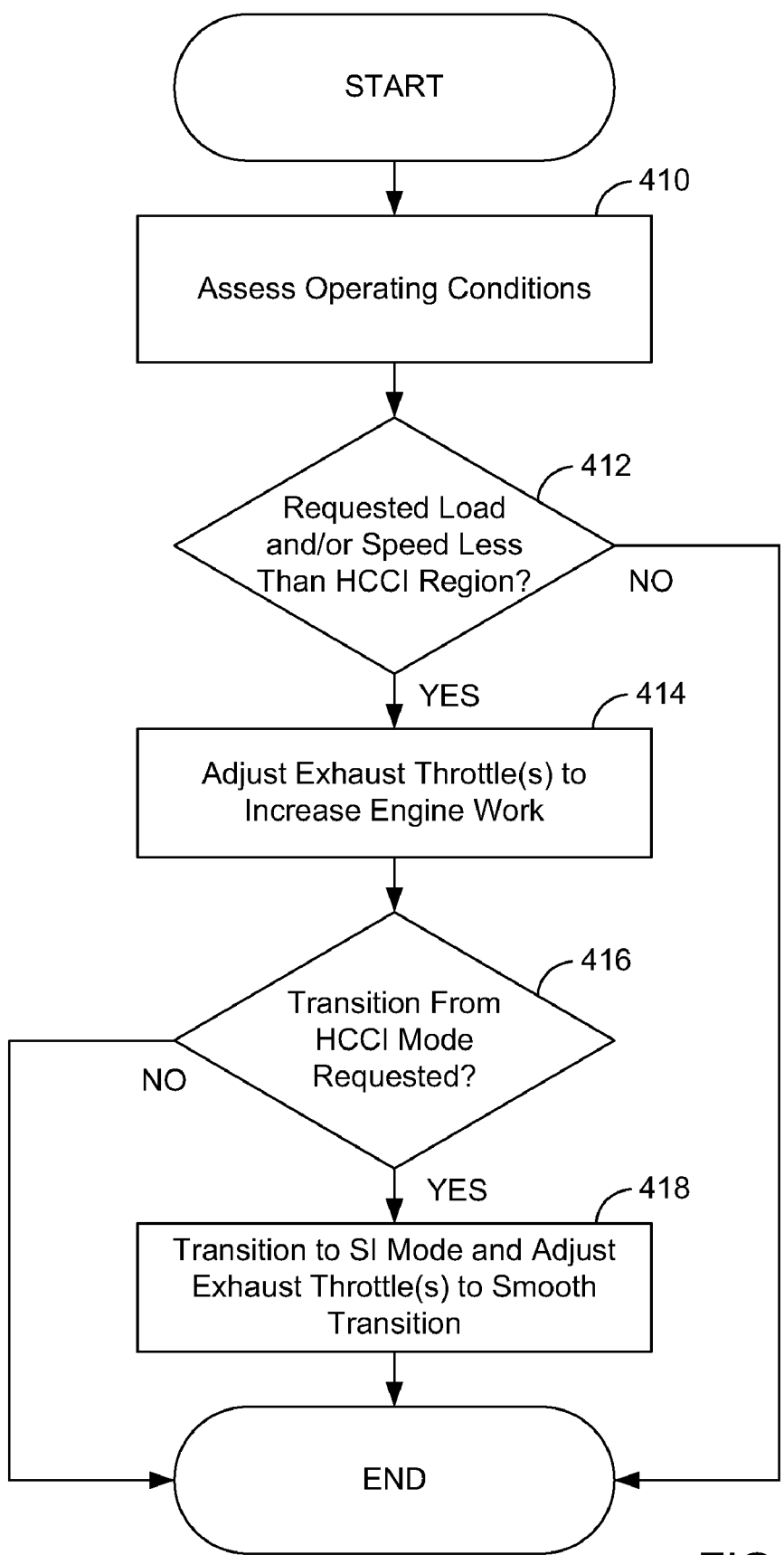
FIGS. 4 and 5 show example control strategies for operating an exhaust throttle to maintain a compression ignition mode.

FIG. 4 shows an example control strategy for maintaining HCCI mode operation within this expanded HCCI region where a transition to SI mode may otherwise be performed. At 410, the control system may assess the operating conditions of the engine and/or vehicle. Operating conditions may include one or more of ambient temperature, pressure, humidity, current and/or future requested engine load and speed, vehicle speed, gear selection, air/fuel ratio, throttle position, turbocharging conditions, EGR contribution, requested torque, etc. At 412, it may be judged whether the requested load and/or speed are less than the HCCI region. For example, if a gear change is requested, the corresponding requested engine speed and/or load may be outside of the HCCI region shown in FIG. 3. If the answer at 412 is no, the routine may end or may return to 410 where the control strategy may be repeated for subsequent cycles.

Alternatively, if the answer at 412 is yes, one or more exhaust throttles may be adjusted to increase the backpressure on the engine, thereby increasing the engine work to maintain the same engine load and speed at 414. In some embodiments, the position of the exhaust throttle(s) may be varied in response to the requested engine speed and/or load. For example, a relatively small decrease in the engine speed and/or load may result in a relatively small adjustment of the exhaust throttle so that a small increase in backpressure is achieved, whereas a relatively larger decrease in the engine speed and/or load may result in a relatively larger adjustment of the exhaust throttle so that a larger increase in backpressure is achieved.

During this process the combustion temperature within the cylinders communicating with the varied exhaust throttle(s) are increased and/or assisted with gas trapping, EGR, etc., which may be desirable for maintaining HCCI operation at low engine speeds and/or loads. However, in some conditions, the exhaust throttle(s) may only be used momentarily to increase the backpressure on the engine as permanent or extended use of exhaust throttling may be detrimental to HCCI fuel economy benefits since a harder working engine uses more fuel. Furthermore, during both SI and HCCI modes it may be desirable for exhaust gas to freely exit the engine without a substantial restriction. Note in terms of fuel economy it may be preferred for an engine to momentarily work harder in HCCI mode than operating in SI mode for the same speed/load condition, at least in some scenarios.

At 416, it may be judged whether a transition from HCCI mode is requested. As exhaust throttling can cause the engine to perform greater work in order to achieve a similar output for substantially similar operating conditions, the efficiency of the engine may decrease during such throttling. As such, in some embodiments, the exhaust throttle may be used to maintain HCCI mode only for a select period of time. For example, a momentary drop in engine speed and/or engine load may be countered by exhaust throttling to maintain HCCI mode, whereas a drop in engine speed and/or engine load of a greater duration may instead result in a transition from HCCI mode to SI mode being performed. Thus, in some scenarios, a transition out of HCCI mode may be unavoidable. If for example, the throttle adjustment performed at 414 was sufficient to maintain the desired HCCI combustion, then the answer at 416 may be no. Alternatively, if the throttle adjustment was insufficient to maintain the desired HCCI combustion or if the time limit assigned to the exhaust throttling operation is attained, then a transition to SI mode may be performed at 418.

Further, during conditions where a transition between HCCI mode and SI mode is to be performed, the exhaust throttle(s) may be used to assist in the transition. In some conditions, transitions from SI mode to HCCI mode may be difficult to achieve since the temperature of the intake air used during SI mode may be cooler than desired for one or more cycles after HCCI mode is initiated and/or after an ignition spark is discontinued. If the operating conditions are not controlled during the transition, then misfire, knock, noise and vibration harshness (NVH), and/or torque fluctuations may occur, or the desired transition may not be achieved. Thus, the control strategy for performing a transition to or from a compression ignition mode (e.g. HCCI) utilizing autoignition may affect the repeatability and robustness of the transition.

In one approach, the desired initial charge temperature difference between SI mode and HCCI mode may be reduced or smoothed by adjusting one or more exhaust throttles before, during, and/or after the transition. For example, by momentarily utilizing at least one exhaust throttle prior to a mode switch will enable the heated properties within the exhaust gas to assist combustion conditioning as preferred for the new mode. This approach may be applied, for example, to facilitate transitions from SI mode to HCCI mode when an initial charge temperature increase is required, i.e. valuable heat is not wasted when the exhaust throttle is used. In this manner, NVH and/or torque disturbances during transitions may be reduced.

Figure 5:
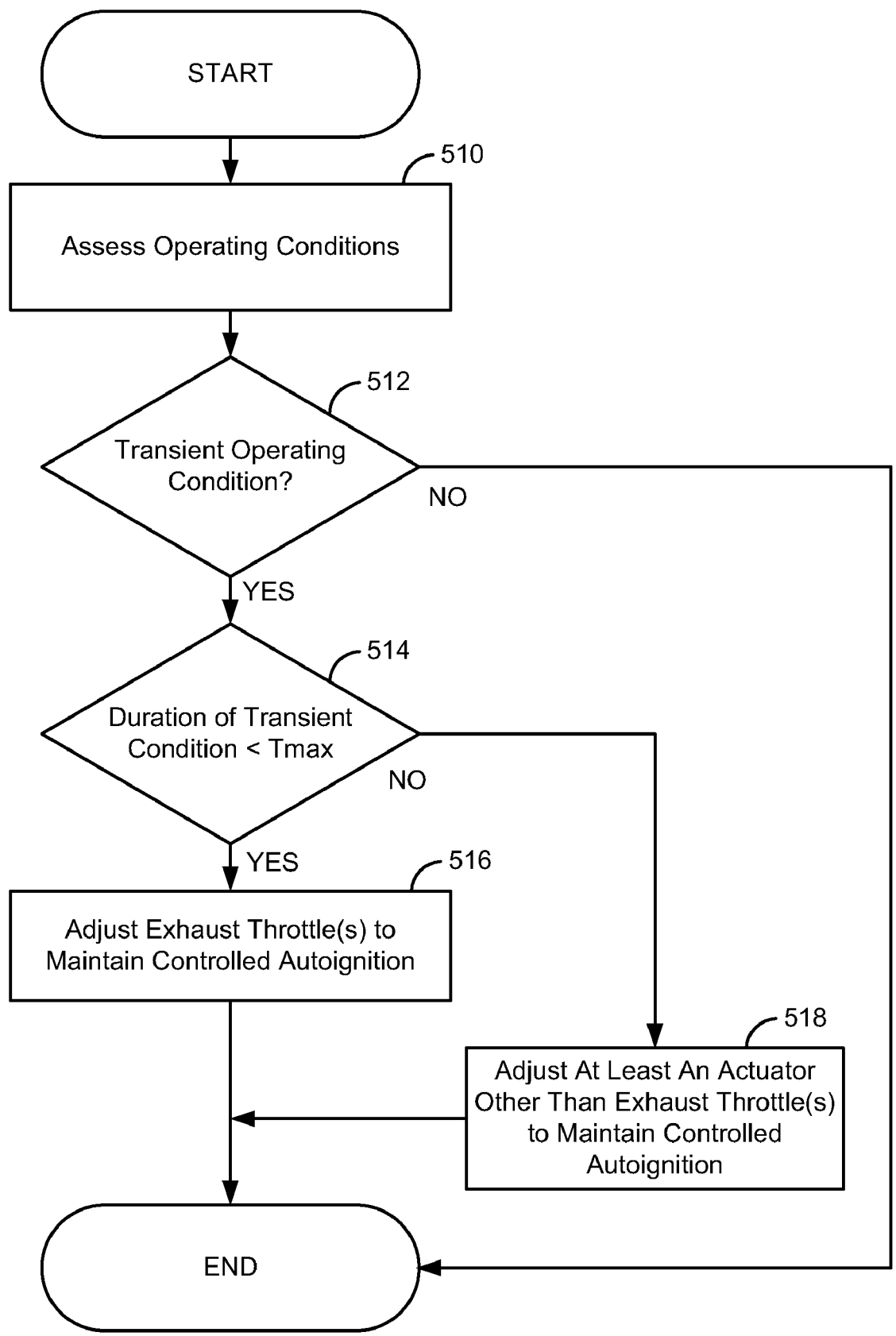

FIG. 5 shows another control strategy for operating at least one exhaust throttle in response to a rapid transient condition. At 510, the control system may assess the operating conditions of the engine, which may include current and/or future predictions of operating conditions. In this example, the engine is operating in a compression ignition mode where autoignition is maintained within the combustion chamber. At 512, it may be judged whether a transient condition is occurring or is predicted to occur. Transient conditions may include a scheduled gear change, a change in engine torque, engine speed, and/or other changes in operating conditions of the engine and/or vehicle. If the answer at 512 is no, then the routine may end or alternatively may return to 510.

Alternatively, if the answer at 512 is yes, the routine may proceed to 514. At 514, it may be judged whether the duration of the transient condition is less than a time threshold (Tmax). If the answer is yes, then at 516, one or more exhaust throttles may be adjusted to maintain controlled autoignition within the combustion chamber. Further, one or more other control operations may be performed such as varying intake throttling, turbocharging, an EGR valve, intake valve and/or exhaust valve operation, etc. Alternatively, if the answer at 514 is no, then at least one actuator other than the exhaust throttle(s) may be operated to maintain controlled autoignition. For example, one or more other actuators controlling intake throttling, turbocharging, an EGR valve, intake valve and/or exhaust valve may be operated to maintain autoignition. In some embodiments, exhaust throttling may also be used to a lesser extent during transient conditions of duration greater than Tmax. Finally, the routine may end or may alternatively return to 510.

Figure 6:
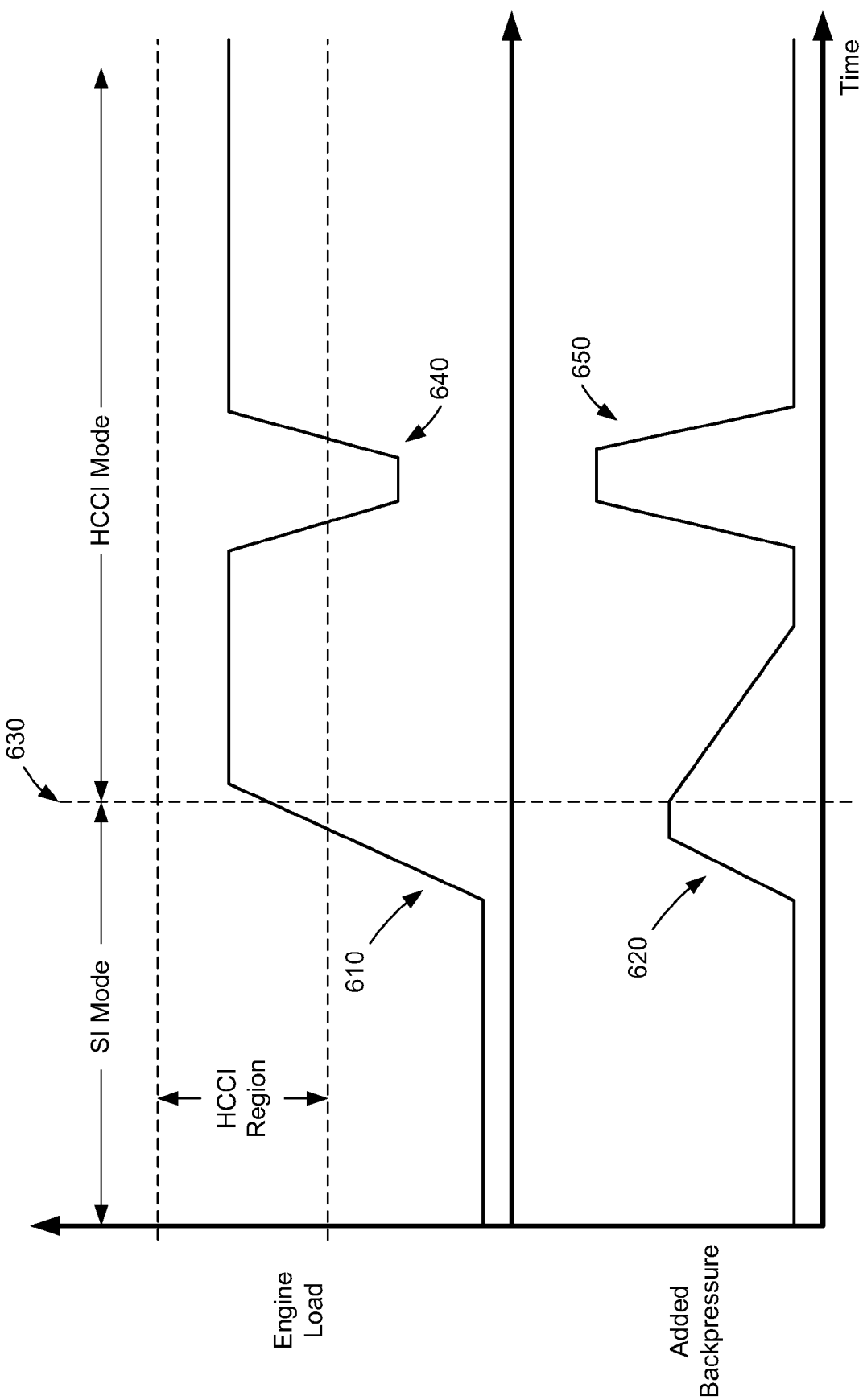
FIG. 6 shows a timeline of an example scenario utilizing some of the exhaust throttling approaches described herein.

FIG. 6 shows a timeline of an example scenario utilizing some of the exhaust throttling approaches described herein. For example, FIG. 6 shows on the upper graph, an operating condition such as engine load compared to the additional backpressure as may be provided by one or more exhaust throttles shown on the lower graph. In this example scenario, the engine is initially operating with all of the cylinders in SI mode at an engine load that is below the HCCI operating region where autoignition may be performed.

At a later time, the engine load may be increased, for example, when a driver causes the vehicle to accelerate. As such, the engine load may increase to within the HCCI region as shown generally at 610, wherein a transition from SI mode to HCCI may be performed at 630, for example. In response to the increase of the engine load and/or the transition, one or more exhaust throttles may be adjusted so that the backpressure supplied to the engine may be increased, for example, as shown generally at 620. In this example scenario, the exhaust throttling may increase when the engine load is increased, and may stop increasing when the HCCI operating region is entered, and may decrease after the transition is performed, however, it should be appreciated that exhaust throttle response may occur before or after a corresponding change in an operating condition. Thus, exhaust throttling may be used before, during and/or after a transition between modes to reduce NVH or torque disruptions caused by the transition.

Next, at a later time, a momentary event such as a gear change or a driver tip-out may occur, wherein the engine load is decreased, as shown generally at 640. In some embodiments, changes in operating conditions may be predicted before they occur. For example, a gear change may be predicted and exhaust throttling may be performed before the gear change is initiated. Further, various operating conditions may be detected by one or more sensor coupled to the engine. In response to a decrease in engine load such as by a gear change or other condition, one or more exhaust throttles may be adjusted so that the backpressure supplied to the engine is again increased. As shown at 650, the exhaust throttling may be momentarily used to maintain HCCI mode, where a transition to another mode may otherwise be requested. As the engine load is returned to the HCCI operating region, the exhaust throttling may be reduced, thereby reducing the backpressure supplied to the engine. In this manner, exhaust throttling may be used to reduce transitions between modes and/or to facilitate transitions between modes.

As described above, exhaust throttling may be varied before or after an anticipated or detected change of one or more operating conditions such as engine load and/or speed. For example, additional backpressure provided by an exhaust throttle may be increased prior to an increase in engine load and/or speed, or change in other operating conditions. Alternatively, additional backpressure provided by an exhaust throttle may be increased subsequent to an increase in engine load and/or speed, or change in other operating conditions. Similarly, additional backpressure provided by an exhaust throttle may be reduced prior to or subsequent to a decrease in engine load and/or speed, or change in other operating conditions.

Further, exhaust throttling may be used before a transition to maintain autoignition while other operating conditions are adjusted in anticipation of the SI mode operation. For example, intake air heating may be reduced while in HCCI mode so that the intake air is sufficiently cooled during the first cycles of the SI mode operation to reduce the occurrence of preignition and/or knock. In response to the decrease in intake air heating, exhaust throttling may be used to maintain the desired charge temperature so that autoignition is maintained at the desired timing. It should be appreciated that the exhaust throttling approach provided herein may be used to maintain HCCI mode and/or facilitate transitions between modes when operating conditions other than engine speed and/or engine load are varied, such as for example, turbocharging conditions, spark timing, EGR contribution, air temperature, air pressure, etc.

Note that the example control and estimation routines included herein can be used with various engine configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 48 of the engine control system.

It will be appreciated that the configurations and routines disclosed herein are exemplary in nature, and that these specific embodiments are not to be considered in a limiting sense, because numerous variations are possible. For example, the above technology can be applied to V-6, V-8, I-4, I-6, V-10, V-12, opposed 4, and other engine types. Further, while some of the exhaust throttling approaches described herein may be applied to engine applications involving HCCI operation or transitions between HCCI and SI, it should nonetheless be appreciated that exhaust throttling may be applied to SI and/or diesel engines without necessarily requiring HCCI operability. For example, exhaust throttling may be used in various engines to vary combustion temperature, dampen torque spikes produced by the engine, or to assist with initial engine conditioning strategies during start-up or warm-up of the engine. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

I claim:

1. A method of operating an engine for a vehicle having at least one cylinder and an exhaust passage communicatively coupled to the cylinder including at least one exhaust throttle disposed therein downstream of the cylinder, the method comprising:
    operating the cylinder to achieve controlled autoignition of an air and a fuel mixture within the cylinder;
    during a first transient condition, increasing an amount of backpressure provided to the cylinder by increasing exhaust throttling to maintain controlled autoignition within the cylinder and then decreasing the amount of backpressure provided to the cylinder by decreasing exhaust throttling; and
    during a second transient condition, adjusting at least an actuator other than the exhaust throttle to maintain controlled autoignition within the cylinder, where said first transient condition is of a shorter duration than said second transient condition.

2. The method of claim 1, wherein said first transient condition is a gear change.

3. The method of claim 1, wherein the actuator other than the exhaust throttle includes a valve actuator controlling at least one of an intake and exhaust valve of the cylinder.

4. The method of claim 1, wherein the actuator other than the exhaust throttle includes a throttle located in an intake passage of the engine.

5. The method of claim 1, wherein the actuator other than the exhaust throttle includes an exhaust gas recirculation valve located in an exhaust gas recirculation passage.

6. The method of claim 1, wherein said first transient condition includes a rapid change in torque produced by the engine and the second transient condition includes a less rapid change in torque produced by the engine.

7. The method of claim 1, wherein said first transient condition includes a rapid change in engine speed and the second transient condition includes a less rapid change in engine speed.

8. The engine of claim 1, wherein said cylinder is further configured to transition between the controlled autoignition operation and a spark ignition operation based on an operating condition of the engine, and in response to a transition from a spark ignition operation to a controlled autoignition operation increasing an amount of backpressure provided to the cylinder by increasing exhaust throttling, and following the transition decreasing the amount of backpressure provided to the cylinder by decreasing exhaust throttling.

9. The method of claim 1, further comprising adjusting the exhaust throttle in response to exhaust gas pressure detected between the exhaust throttle and the cylinder.

10. A method of operating an engine for a vehicle having at least one cylinder configured to vary operation between a compression ignition mode and a spark ignition mode, wherein an exhaust passage operatively coupled to the cylinder includes at least one exhaust throttle disposed therein downstream of the cylinder, the method comprising:
in response to a transition from a spark ignition operation to a controlled autoignition operation, increasing an amount of backpressure provided to the cylinder by increasing exhaust throttling, and following the transition decreasing the amount of backpressure provided to the cylinder by decreasing exhaust throttling.

11. The method of claim 10, wherein the transition is enacted in response to a requested output of the engine.

12. The method of claim 10, wherein the transition is enacted in response to a gear change.

13. The method of claim 10, further comprising adjusting the exhaust throttle in response to exhaust gas pressure detected between the exhaust throttle and the cylinder.

* * * * *

UNITED STATES PATENT AND TRADEMARK OFFICE
CERTIFICATE OF CORRECTION

| | |
|---|---|
| PATENT NO. | : 7,866,148 B2 |
| APPLICATION NO. | : 11/532451 |
| DATED | : January 11, 2011 |
| INVENTOR(S) | : Jonathan O'Neill and Themi Petridis |

It is certified that error appears in the above-identified patent and that said Letters Patent is hereby corrected as shown below:

On Title Page 1, section (75), add joint inventor "Themi Petridis" therefor.

Signed and Sealed this
Twenty-eighth Day of June, 2011

David J. Kappos
*Director of the United States Patent and Trademark Office*